(12) United States Patent
Hussain

(10) Patent No.: US 6,205,531 B1
(45) Date of Patent: Mar. 20, 2001

(54) METHOD AND APPARATUS FOR VIRTUAL ADDRESS TRANSLATION

(75) Inventor: Zahid S. Hussain, San Carlos, CA (US)

(73) Assignee: Silicon Graphics Incorporated, Mountian View, CA (US)

( * ) Notice: Subject to any disclaimer, the term of this patent is extended or adjusted under 35 U.S.C. 154(b) by 0 days.

(21) Appl. No.: 09/109,476

(22) Filed: Jul. 2, 1998

(51) Int. Cl.⁷ ................................................... G06F 12/10
(52) U.S. Cl. .................. 711/207; 711/208; 711/209; 711/219; 711/220; 345/516
(58) Field of Search ................... 711/207, 209, 711/219, 220, 208; 345/516

(56) References Cited

U.S. PATENT DOCUMENTS

| | | | |
|---|---|---|---|
| 4,376,297 | | 3/1983 | Anderson et al. ............... 711/207 |
| 4,680,700 | * | 7/1987 | Hester et al. ................... 711/206 |
| 5,809,563 | * | 9/1998 | Yamada et al. ................. 711/207 |
| 5,914,727 | * | 6/1999 | Horan et al. ................... 345/503 |
| 5,918,251 | * | 6/1999 | Yamada et al. ................. 711/207 |
| 5,940,872 | * | 8/1999 | Hammond et al. .............. 711/207 |

FOREIGN PATENT DOCUMENTS

| | | |
|---|---|---|
| 0 382 237 | 8/1990 | (EP) . |
| 0 766 177 | 4/1997 | (EP) . |

* cited by examiner

*Primary Examiner*—Reginald G. Bragdon
(74) *Attorney, Agent, or Firm*—Squire, Sanders & Dempsey L.L.P.

(57) ABSTRACT

A method and apparatus for efficiently translating virtual to physical addresses is provided. An embodiment of the apparatus includes a TLB descriptor table that includes a series of TLB descriptors. Each TLB descriptor includes an offset that selects a TLB segment within a translation lookaside buffer (TLB). To perform a virtual to physical address translation, a processor sends a virtual address and a descriptor ID to the memory request unit. The descriptor ID is used to select the TLB segment that will be used to perform the virtual to physical address translation. Each TLB segment may have different physical and logical characteristics. In particular, each TLB segment may be associated with a different type of memory page. In this way the present invention, enables the simultaneous use of a range of page types and sizes in a single computer system.

19 Claims, 3 Drawing Sheets

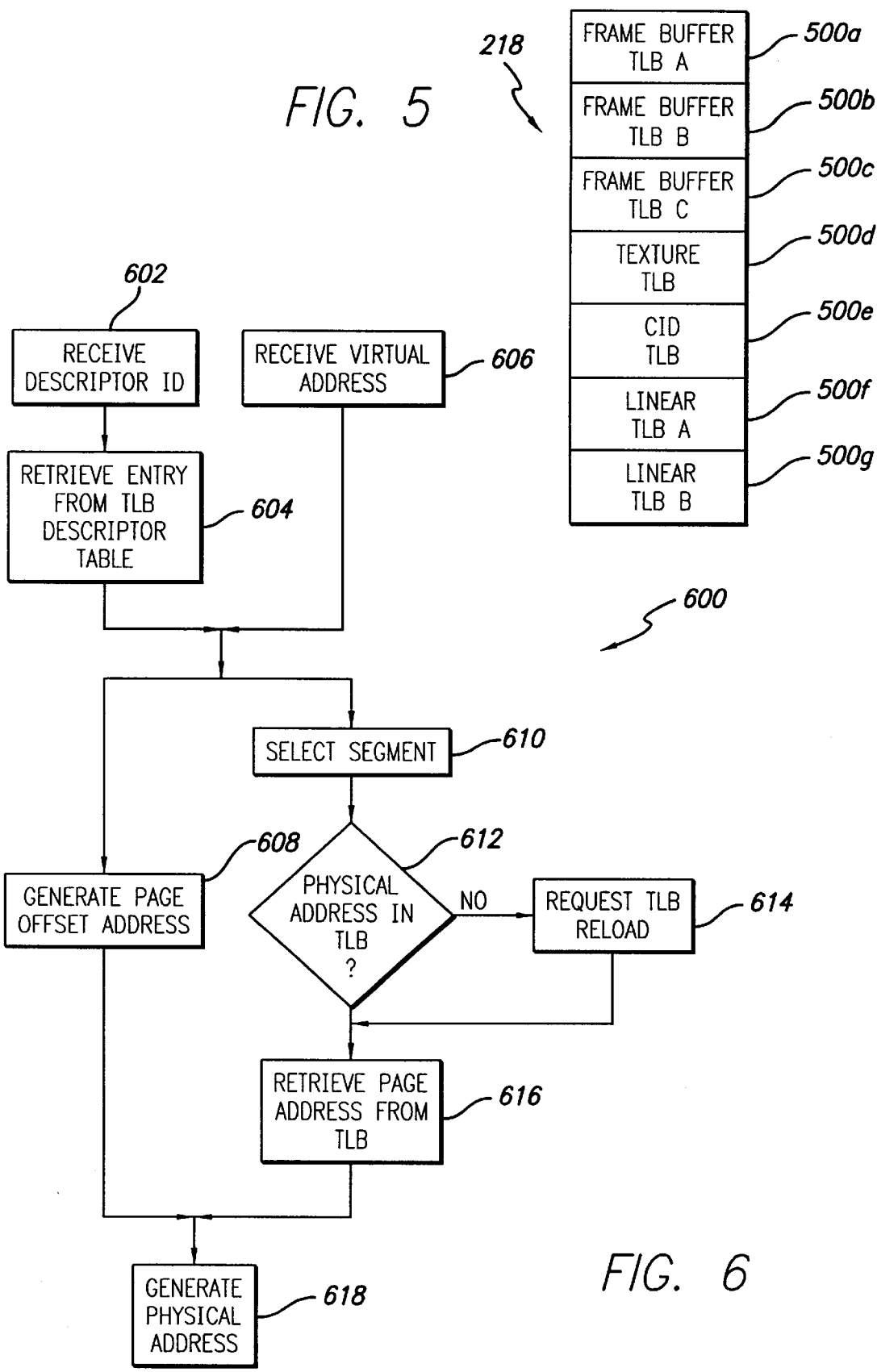

METHOD AND APPARATUS FOR VIRTUAL ADDRESS TRANSLATION

RELATED APPLICATIONS

The following co-pending patent is related to the subject application and is herein incorporated by reference:

U.S. Pat No. 6,104,417, entitled "A Unified Memory Computer Architecture With Dynamic Graphics Memory Allocation" of Michael J. K. Nielsen and Zahid S. Hussain.

FIELD OF THE INVENTION

The present invention relates generally to virtual memory systems for computers and related devices. More specifically, the present invention includes a method and apparatus for translating virtual to physical addresses that provides simultaneous support for a wide range of memory uses.

BACKGROUND OF THE INVENTION

Modern computer systems typically provide some form of virtual memory environment. In an environment of this type, application processes (and in some cases, system processes) access memory using virtual addresses. The computer system is responsible for translating these virtual addresses into physical addresses within the memory of the computer system.

In a typical virtual memory environment, the virtual address space and the physical address space are both divided into fixed size pages. Each virtual address is a combination of a virtual page address and a page offset. Each physical address is a combination of a physical page address and a page offset. Using this system, page addresses may change during address translation, but page offsets remain the same.

The computer system maintains a set of data structures, known as page tables, for each process. The page tables provide a per-process mapping between virtual page addresses and physical page addresses. Translation of a virtual address is accomplished by using the page table to find the physical page address that matches the virtual address being translated. The page offset portion of the virtual address being translated is then added to the physical page address to form the complete physical address.

To provide adequate performance, computer systems using virtual memory typically cache recent translations between virtual and physical page addresses. In most cases, this type of caching is performed by a dedicated cache known as a translation lookaside buffer, or TLB. Use of a TLB dramatically speeds translation because repeated translations involving the same physical page address are performed without the use of page tables.

The performance benefit associated with the use of TLBs has made them indispensable components of virtually all computer systems where virtual memory is used. Still, it is generally the case that traditional TLB implementations have a number of limitations. One limitation is the inability of traditional TLBs to effectively manage systems that include a number of different page types. For example, a computer system may include pages that use linear addressing (where locations in memory are arranged as a linear sequence) and pages that use tiled addressing (where locations in memory are arranged as a number of rows). The same system may also include a number of different sizes for both tiled and linear pages.

Using different page types allows a computer system to optimize performance. Instructions and data that tend to be accessed in a linear fashion may be placed in linear pages. Specialized structures, such as frame buffers, that tend to be accessed on a row-by-row basis, may be placed in tiled pages. In each case, page sizes may be chosen to optimize performance and reduce memory fragmentation.

To use different page types effectively, a TLB must be able to cache translations to each page type. This is problematic because most TLB implementations are geared towards caching only a single type of translation. Effective use of different page types also requires that the TLB be able to separately manage each type. Separate management allows the computer system to prevent the TLB from being monopolized by translations to any particular type of page. Based on the foregoing, it may be appreciated that a need exists for TLB systems that allow for simultaneous use of a range of page types and sizes. A need also exists for systems that allow different page types and sizes to be separately managed.

SUMMARY OF THE INVENTION

The present invention includes a method and apparatus for efficiently translating virtual to physical addresses. A representative environment for the present invention includes a host computer system. The host computer system includes one or more host processors, a rendering engine and a system memory. The host processor and rendering engine access the system memory by sending requests to a memory request unit.

The memory request unit includes a TLB descriptor table that includes a series of TLB descriptors. Each TLB descriptor includes an offset that selects a segment within a translation lookaside buffer (TLB). To perform a virtual to physical address translation, the rendering engine or host processors send requests to the memory request unit. Each request includes a virtual address and a descriptor ID. The memory request unit uses the descriptor ID as an index into the TLB descriptor table. Using this index, the memory request unit selects a TLB descriptor from the TLB descriptor table.

The memory request unit then uses the offset included in the selected TLB descriptor to select a segment of the TLB. This segment is then examined to determine if it includes a physical page address for the virtual address being translated. If the selected TLB segment does not include a physical page address for the virtual address being translated, a TLB miss occurs. In this event, a host processor reloads the TLB to include the required physical page address. In either case, examination of the selected TLB segment generates a page address for the virtual address being translated.

The memory request unit then combines the physical page address with the page offset portion of the virtual address being translated. The result is a physical address that corresponds to the virtual address being translated.

Use of the TLB descriptor table allows the host processors to manage the TLB as a series of segments or sub-TLBs. Each TLB segment may have different physical and logical characteristics. This allows the same TLB interface to simultaneously support a wide range of different page types within the same system memory. Simultaneous support for different page types, such as tiled and linear memory of various tile and page sizes, enhances the flexibility and efficiency of the system memory. The use of the TLB descriptor table also allows the host processors to separately manage the sub-TLBs and the pages of system memory referenced by these sub-TLBs. This provides a better division of resources among the different uses of the system memory.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

FIG. 5 is a block diagram showing a segmented translation lookaside buffer in accordance with an embodiment of the present invention.

FIG. 6 is a flowchart showing the steps performed by the memory request unit to perform a virtual to physical address translation in accordance with an embodiment of the present invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

Environment

Figure 1:
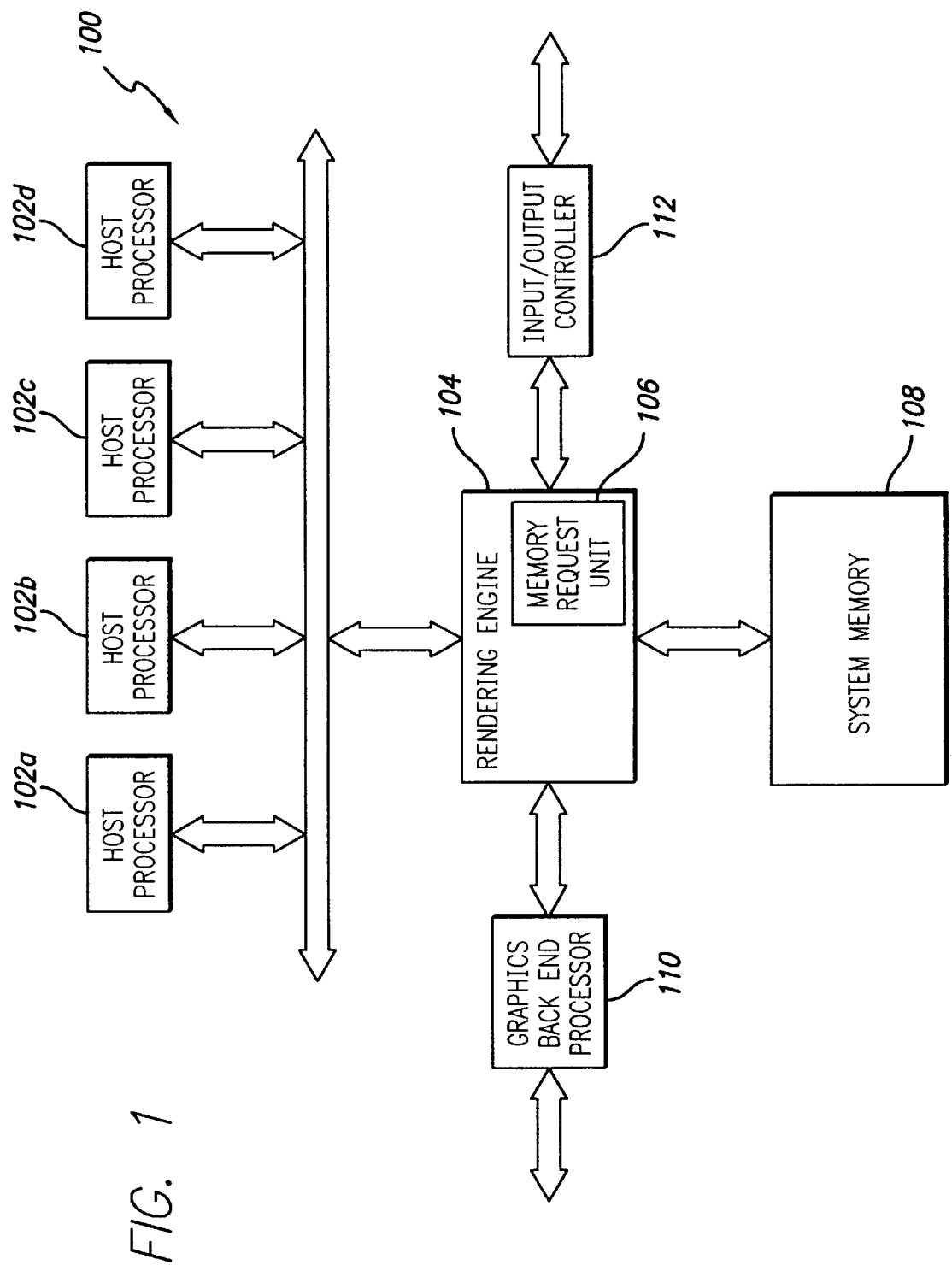
FIG. 1 is a block diagram of a host computer system shown as an exemplary environment for an embodiment of the present invention.

In FIG. 1, a host computer system 100 is shown as a representative environment for the present invention. Structurally, host computer system 100 includes a host processor, or host processors, of which host processors 102a through 102d are representative. Host processors 102 represent a wide range of commercially available or proprietary types. Host computer system 100 may include either more or fewer host processors 102 than the four shown for the representative environment of host computer system 100.

Host computer system 100 also includes a rendering engine 104. Rendering engine 104 includes a memory request unit 106. Rendering engine 104 is connected to a system memory 108. Host processors 102 are also connected to system memory 108. For the particular embodiment shown in FIG. 1, the connection between host processors 102 and system memory 108 passes through rendering engine 104.

Preferably, rendering engine 104 performs the majority of its processing using the memory included in system memory 108. This avoids the delays that result if graphics primitives or data are moved from system memory 108 to a separate memory within rendering engine 104. Rendering engine 104 uses memory request unit 106 to address system memory 108. Memory request unit 106 allows rendering engine 104 and host processors 102 to address system memory 108 in a consistent manner. In particular, memory request unit 106 allows rendering engine 104 and host processors 102 to use the same virtual addresses to refer to the same locations in system memory 108.

To access system memory 108, host processors 102 and rendering engine 104 send virtual memory access requests to memory request unit 106. Memory request unit 106 translates the requests into corresponding physical memory access requests. The physical memory access requests are then passed to system memory 108. For the described embodiment, memory request unit 106 and system memory 108 support a range of page types, including tiled and linear pages. Memory request unit 106 and system memory 108 also support a range of page sizes for both tiled and linear pages including 128-byte per row tiles and 512 byte-per row tiles.

Host computer system 100 also includes a backend graphics processor 110 and an input/output controller 112. Backend graphics processor performs tasks that occur near the end of a graphics pipeline. Typically, this includes scan conversion of frame buffer memory for display output. Input/output controller 112 functions as a channel allowing host computer system 100 to be connected to a wide range of input/output devices, such as disk drives, non-volatile storage systems, keyboards, modems, network adapters, and printers.

As mentioned, host computer system 100 is shown as a representative environment for the present invention. Additional details of this representative environment are discussed in co-pending, commonly owned U.S. application Ser. No. 08/713,779, filed Sep. 15, 1996, entitled "A Unified Memory Computer Architecture With Dynamic Graphics Memory Allocation" of Michael J. K. Nielsen and Zahid S. Hussain. It should be appreciated, however, that the present invention is equally applicable to a range of computer systems and related devices and is not limited to the representative environment of host computer system 100.

Address Translation Apparatus

An embodiment of the present invention includes an apparatus for translating virtual addresses generated by rendering engine 104 or host processors 102 to physical addresses used by memory request unit 106. For the described embodiment, this apparatus is included within memory request unit 106. Structural details of this apparatus are better appreciated by reference to FIG. 2.

Figure 2:
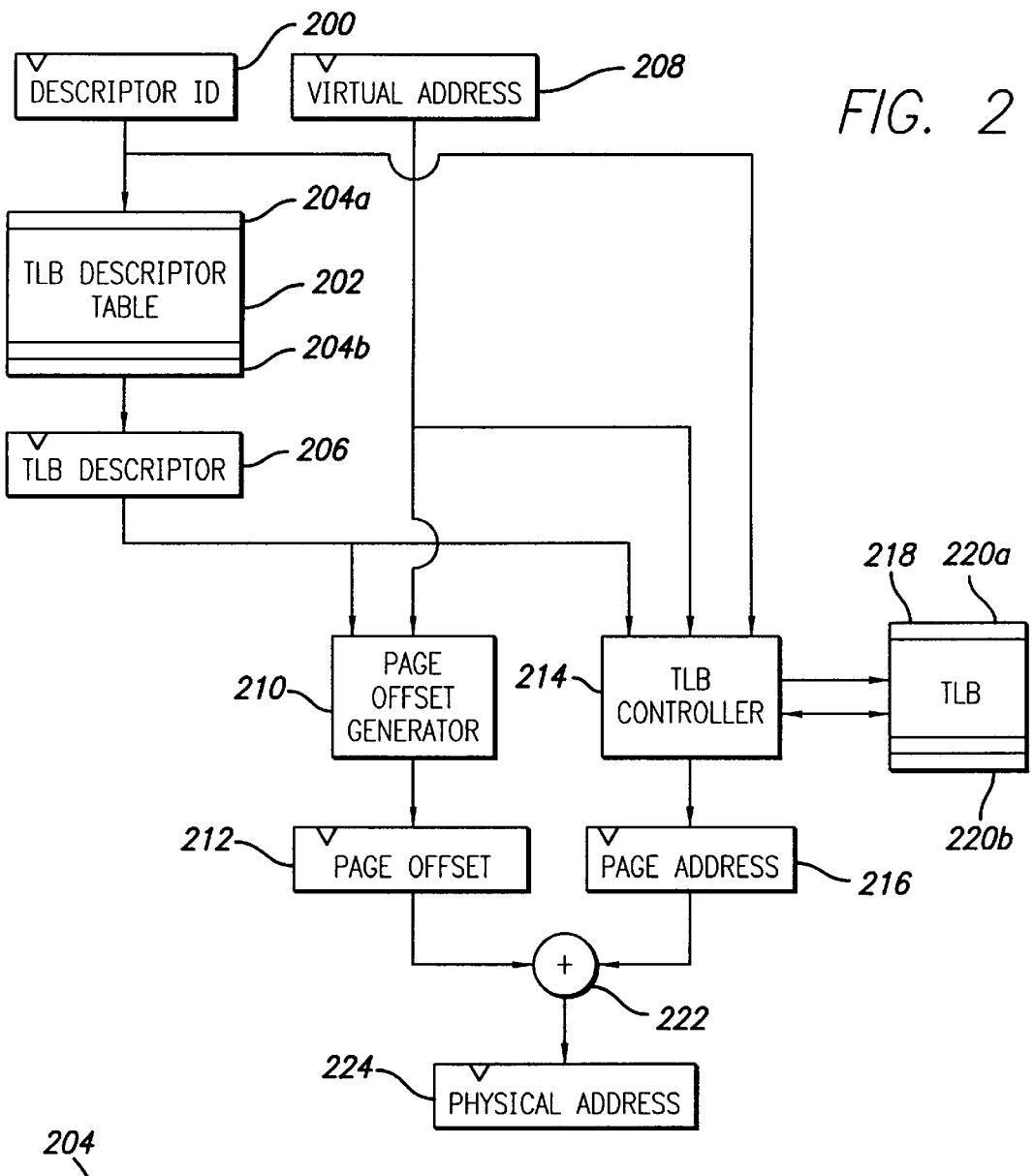
FIG. 2 is a block diagram of a memory request unit in accordance with an embodiment of the present invention.

FIG. 2 shows that memory request unit 106 includes a Descriptor ID input register 200 connected to a TLB descriptor table 202. TLB descriptor table 202 is a memory storage device that is typically fabricated using one or more random access memory (RAM) devices. TLB descriptor table 202 includes a sequence of TLB descriptors, of which TLB descriptors 204a and 204b are representative. Depending on the needs of the particular environment, TLB descriptor table 202 may be fabricated with relatively few, or relatively many, TLB descriptors 204. For the particular embodiment being described, it may be assumed that TLB descriptor table 202 includes a total of 64 TLB descriptors 204. Descriptor ID input register 200 functions as an address into TLB descriptor table 202. Consequently, Descriptor ID input register 200 is fabricated to include a number of bits equal to logarithm base two of the number of TLB descriptors 204 included in TLB descriptor table 202. In the case of the embodiment being described, this means that Descriptor ID input register 200 includes $\log_2$ 64 or six bits.

A TLB descriptor register 206 is connected to TLB descriptor table 202. TLB descriptor register 206 allows a TLB descriptor 204 to be retrieved from TLB descriptor table 202. This is accomplished by initializing Descriptor ID input register 200 to contain the address of the desired TLB descriptor 204 and then reading the desired TLB descriptor 204 in to TLB descriptor register 206.

Figure 3:
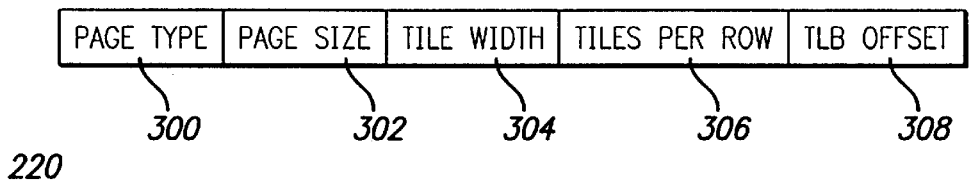
FIG. 3 is a block diagram showing a descriptor table entry in accordance with an embodiment of the present invention.

Structural details of the TLB descriptors 204 included in TLB descriptor table 202 and TLB descriptor register 206 are shown more clearly in FIG. 3. FIG. 3 shows that a representative TLB descriptor 204 includes fields for page type (300), page size (302), tile width (304), tiles per row (306) and tlb offset (308). Each of these fields is used to control how a virtual address is translated to a physical address. For the embodiment being described, page type 300 is used to select between tiled and linear memory. Page size 302 is used to select the size of the page that includes an address being translated. Tile width 304 is used to select the number of columns of the tile that includes an address being translated. It may be appreciated that tile width 304 is typically only relevant when page type 300 indicates that tiled memory is being used. Tiles per row 306 is similar to tile width 304, except that tiles per row 306 is used to select the number of tiles included in a memory row. Like tile width 304, tiles per row 306 is typically relevant only when page type 300 indicates that tiled memory is being used. TLB offset 308 contains an offset into the translation lookaside buffer (TLB) included in memory request unit 106. TLB offset 308 and the TLB included in memory request unit 106 will be described in greater detail in latter portions of this document.

Returning to FIG. 2, it may be seen that memory request unit 106 includes a virtual address input register 208. Virtual address input register 208 is used to contain a virtual address to be translated. The number of bits included in virtual address input address register 208 depends on the amount of virtual memory that may be included in host computer system 100. For many implementations, virtual address input address register 208 will include thirty-two or more bits.

TLB descriptor register 206 and virtual address input address register 208 are connected as inputs to a page offset generator 210. Page offset generator 210 is connected, in turn, to a page offset register 212. Page offset generator 210 uses the virtual address in virtual address input register 208 and the TLB descriptor in TLB descriptor register 206 to calculate a page offset. Page offset generator 210 stores the result of this calculation in page offset register 212. The page offset calculated and stored by page offset generator 210 is the distance (offset) from the beginning of a page in system memory 106 that includes the virtual address being translated. For the described embodiment, page offset generator 210 calculates page offsets by transferring the least significant portion of virtual address input address register 208 to page offset register 212. The size of the portion (i.e., the number of bits) transferred to page offset register 212 depends on the page size 302 included in TLB descriptor register 206. Specifically, page offset generator 210 transfers the n least significant bits virtual address of input address register 208 where n is equal to logarithm base two of the page size defined by page size 302 of TLB descriptor register 206. For example, if page size 302 indicates that a page size of four kilobytes is being used, page offset generator 210 transfers $\log_2 4096$ or twelve bits.

TLB descriptor register 206 and virtual address input address register 208 are also connected as inputs to a TLB controller 214. TLB controller 214 is connected, in turn, to a page address register 216 and a translation lookaside buffer (TLB) 218. TLB 218 is a memory storage device that is typically fabricated using one or more random access memory (RAM) devices. TLB 218 includes a includes a sequence of TLB entries, of which TLB entries 220a and 220b are representative. Depending on the needs of the particular environment, TLB 218 may be fabricated with relatively few, or relatively many, TLB entries 220. For the particular embodiment being described, it may be assumed that TLB 218 includes a total of 1024 TLB entries 220.

Figure 4:
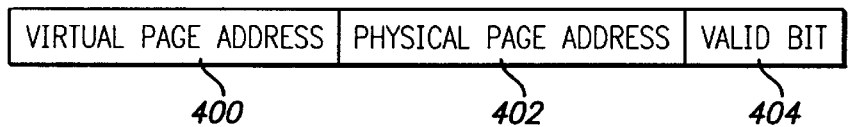
FIG. 4 is a block diagram showing a translation lookaside buffer entry in accordance with an embodiment of the present invention.

Structural details of the TLB entries 220 included in TLB 218 are shown more clearly in FIG. 4. FIG. 4 shows that a representative TLB entry 220 includes fields for virtual page address (400), physical page address (402), and valid bit (404). Fields 400 through 404 provide a mapping between pages in virtual memory and pages in physical memory. For this mapping, virtual page address 400 is initialized with the virtual memory address of a given page. Physical page address 402 is initialized with the physical memory address of the same page. In this way, TLB entries 220 provide a mapping between the virtual and physical memory addresses of memory pages.

The valid bit 404 portion of a TLB entry 220 indicates whether the entry has been initialized. Initially, all TLB entries 220 included in TLB 218 are un-initialized and all valid bits 404 are set to a false value. Subsequently, for the described embodiment, host processors 102 initialize TLB entries 220 on an as needed basis. Each initialized TLB entry 220 includes a valid combination of a virtual page address 400 and physical page address 402. Each initialized TLB entry 220 also includes a valid bit 404 set to a true value. In general, it may be appreciated that the preceding description is directed to a system where host processors 102 manage the contents of TLB 218. This description is intended to be representative in nature and it should be noted that the method and apparatus of the present invention are equally applicable to systems where TLB management is performed by dedicated hardware.

Within TLB 218, TLB entries 220 are logically grouped. This is more easily appreciated by reference to FIG. 5 where a representative embodiment of TLB 218 is shown to include a series of TLB segments 500a through 500g. Each TLB segment 500 is associated with a particular use of system memory 106. For example, TLB segments 500a through 500c are all associated with use of system memory 106 as frame buffers. TLB segments 500d and 500e are associated with use of system memory 106 for texture mapping and color indexing, respectively. Finally, TLB segments 500f and 500g are associated with use of system memory 106 as linear addressed memory. In general, the number and type of TLB segments 500 included in TLB 218 is entirely implementation dependent. Each TLB segment 500 may include any number of TLB entries 220. The type and structure of TLB entries 220 may vary between segments. For example, the TLB entries 220 included in TLB segments 500a through 500e may differ from the entries 220 included in TLB segments 500f and 500g. The TLB offset 308 portions of TLB descriptors 204 and TLB descriptor register 206 identify TLB segments 500 within TLB 218. For the described embodiment, each TLB offset 308 contains the address of a TLB segment 500 within TLB 218. In this way, each TLB offset 308 points to (or identifies) a particular TLB segment 500.

Within memory request unit 106, TLB controller 214 is responsible for calculating a page address for each virtual address being translated. The page address calculated by TLB controller 214 is the address of a page in system memory 106 that includes the virtual address being translated. To perform this function, TLB controller 214 uses the TLB offset 308 portion of TLB descriptor register 206 to select a TLB segment 500 within TLB 218. In effect, TLB controller 214 uses TLB offset 308 to select between a series of separate sub-TLBs, each dedicated to a particular use of system memory 106. TLB controller 214 then examines the selected TLB segment 500 to determine if it includes an initialized TLB entry 220 having a virtual page address 400 that matches virtual address input register 208. If the selected TLB segment 500 includes a matching TLB entry 220, TLB controller 214 transfers the physical page address 402 of the matching TLB entry 220 to page address register 216. In cases where the selected TLB segment 500 does not include a matching TLB entry 220, TLB controller 214 sends a request to host processors 102 indicating that a TLB miss has occurred. Host computer system 100 may use a number of different strategies to deal with TLB misses of this type. Typically, TLB misses are handled by having one of host processors 102 reload TLB 218 to include the required TLB entry 220. Reloading TLB 218 allows translation interrupted by the TLB miss to be retried or restarted.

TLB controller 214 and TLB 218 may be configured to examine TLB segments 500 using a range of different TLB techniques and implementations. For example, each TLB segment 500 may be implemented as an associative cache. In this type of arrangement, each virtual address included in virtual address input register 206 maps to a subset of the TLB entries 220 included in a selected TLB segment 500. Each of these TLB entries 220 may be searched in parallel (or in sequence) to determine if a particular virtual address has a corresponding TLB entry 220. Alternatively, each TLB segment 500 may be configured as a linear sequence of TLB entries 220. The linear sequence is then sequentially searched to determine if a particular virtual address has a corresponding TLB entry 220. Other TLB techniques and strategies may be more suited to particular implementations. It is also the case that different TLB segments 500 may include different TLB techniques. For example, TLB segment 500a may be configured to act as a two-way set associative cache. Within the same implementation, TLB segment 500b may be configured to act as a four-way set associative cache.

Page offset register 212 and page address register 216 are each connected to an adder 222. Adder 222 combines the page offset included in page offset register and the page address included in page address register 216 to form a physical address. Adder 222 writes the physical address into physical address register 224. Physical address register 224 represents the output of memory request unit 106.

Address Translation Method

An embodiment of the present invention includes a method for translating virtual addresses generated by rendering engine 104 or host processors 102 to physical addresses used by memory request unit 106. For the described embodiment, this method is executed by memory request unit 106. The details of this method are better appreciated by reference to FIG. 6 where a representative implementation of this method is shown and generally designated 600.

Method 600 begins with step 602 where memory request unit 106 receives a descriptor ID from rendering engine 104 or a host processor 102. The descriptor ID is written into descriptor ID input register 200 by rendering engine 104 or the requesting host processor 102. In step 604, memory request unit 106 uses the contents of descriptor ID input register 200 (i.e., the descriptor ID received in the preceding step) as an index into TLB descriptor table 202. Memory request unit 106 selects the TLB descriptor 204 indexed by the received descriptor ID and writes that TLB descriptor 204 into TLB descriptor register 206.

In parallel with steps 602 and 604, memory request unit 106, in step 606, receives a virtual address from rendering engine 104 or a host processor 102. The virtual address is written into virtual address input register 208 by rendering engine 104 or the requesting host processor 102. Step 606 is shown to occur in parallel with steps 602 and 604. This ordering maximizes concurrency within memory request unit 106. In other embodiments, it is entirely practical for step 606 to occur either before or after steps 602 and 604.

In step 608, page offset generator 210 extracts the page offset of the virtual address received in step 606. As discussed previously discussed, page offset generator 210 performs this function by transferring the n least significant bits of virtual address input address register 208 to page offset register 212 where n is equal to logarithm base two of the page size defined by page size 302 of TLB descriptor register 206.

The next sequence of steps including steps 610 through 616 are executed in parallel with step 608. This ordering maximizes concurrency within memory request unit 106. In other embodiments, it is entirely practical for steps 610 through 616 to occur either before or after step 608. In step 610, TLB controller 214 uses the TLB offset 308 portion of TLB descriptor register 206 as an address into TLB 218. TLB controller 214 selects the TLB segment 500 that starts at this address in TLB 218.

In step 612, TLB controller 214 attempts to match the contents of virtual address input register 208 with the TLB entries 220 included in the selected TLB segment 500. The method used by TLB controller 214 to perform this step depends largely on the implementation of TLB 218 and on the implementation of the selected TLB segment 500 within TLB 218. Regardless of the method used, however, TLB controller 214 determines (in step 612) whether the selected TLB segment 500 includes a TLB entry 220 having a virtual page address 400 that matches the virtual page address portion of virtual address input register 208.

In the event that TLB controller 214 is unable to locate a matching TLB entry 220 in the selected TLB segment 500 a TLB miss has occurred. In this case, execution of method 600 continues at step 614 where TLB controller 214 requests that host processors 102 reload TLB 218. Reloading TLB 218 results in the initialization of a TLB entry 220 that matches the contents of virtual address input register 208.

In step 616, TLB controller 214 retrieves the physical page address 402 included in the TLB entry 220 retrieved in steps 610 through 614. TLB controller 214 writes this physical page address 402 into page address register 216. Method 600 completes as memory request unit 106 (in step 618) combines the page offset generated in step 608 with the page address generated in step 616. Memory request unit 106 performs this step using adder 222. The result of this addition is a physical address corresponding to the virtual address received in step 606. Memory request unit 106 stores this physical address in physical address output register 224.

Based on the foregoing description, it may be appreciated that the present invention provides a method and apparatus for performing virtual to physical address translation that allow for simultaneous use of a range of page types and sizes. The method and apparatus also allow different page types and sizes to be separately managed.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A system for translating virtual addresses to physical addresses, the system comprising:

a TLB partitioned as a series of logically grouped TLB segments, each TLB segment associated with a particular use of a system memory and including one or more TLB entries, with each TLB entry including a mapping between a virtual memory page and a physical page address, wherein the particular use of a system memory is selected from the group consisting of frame buffering, texture mapping, color indexing, and linear addressing of memory;

means for selecting a TLB segment using a descriptor ID received from a processor; and means for locating a TLB entry within the selected TLB segment, the located TLB entry including a mapping between the virtual memory page of a virtual address received from a processor and a corresponding page address.

2. A system as recited in claim 1 further comprising means for generating a TLB miss in the event that the selected TLB segment does not include a TLB entry that maps the virtual memory page of the virtual address in a virtual address input register to a corresponding page address.

3. A system as recited in claim 1 wherein the means for selecting a TLB segment using a descriptor ID further comprises:

a TLB descriptor table, the TLB descriptor table including a series of descriptor table entries with each descriptor table entry being associated with a TLB segment; and a descriptor ID input register for receiving the descriptor ID from the processor, the descriptor ID in the descriptor ID input register selecting a descriptor table entry.

4. A system as recited in claim 1 wherein the means for locating a TLB entry within the selected TLB segment further comprises:

a TLB controller, the TLB controller configured to search the selected TLB segment for a TLB entry that maps the virtual memory page of the virtual address received from a processor to a corresponding page address.

5. A system as recited in claim 1 further comprising:

a page offset generator, the page offset generator configured to extract a page offset from the virtual address received from a processor; and an adder, the adder configured to add the page offset to the page address.

6. A system as recited in claim 1 wherein the TLB includes segments for tiled and linear memory.

7. A system as recited in claim 1 wherein the processor is a rendering engine.

8. A system for translating virtual addresses to physical addresses, the system comprising:

a TLB partitioned as a series of logically grouped TLB segments, each TLB segment associated with a particular use of a system memory and including one or more TLB entries, with each TLB entry including a mapping between a virtual memory page and a physical page address, wherein the particular use of a system memory is selected from the group consisting of frame buffering, texture mapping, color indexing, and linear addressing of memory;

a TLB descriptor table, the TLB descriptor table including a series of descriptor table entries with each descriptor table entry being associated with a TLB segment;

a descriptor ID input register for receiving a descriptor ID from a processor, the descriptor ID in the descriptor ID input register selecting a descriptor table entry;

a virtual address input register for receiving a virtual address from a processor; and a TLB controller, the TLB controller configured to use the selected descriptor table entry to select a TLB segment, the TLB controller also configured to search the selected TLB segment for a TLB entry that maps the virtual memory page of the virtual address in the virtual address input register to a corresponding page address.

9. A system as recited in claim 8 wherein the TLB controller is further configured to generate a signal indicating a TLB miss in the event that the selected TLB segment does not include a TLB entry that maps the virtual memory page of the virtual address in the virtual address input register to a corresponding page address.

10. A system as recited in claim 8 further comprising:

a page offset generator, the page offset generator configured to extract a page offset from the virtual address in the virtual address input register; and an adder, the adder configured to add the page offset to the page address.

11. A system as recited in claim 8 wherein the TLB includes segments for tiled and linear memory.

12. A system as recited in claim 8 wherein the processor is a rendering engine.

13. A system as recited in claim 8 wherein the descriptor table entries and TLB entries are initialized by a processor.

14. A method for translating virtual addresses to physical addresses, the method comprising the steps of:

receiving a descriptor ID from a processor;

partitioning, by a processor, a TLB into a series of logical TLB segments;

using the descriptor to select a TLB segment, each TLB segment associated with a particular use of a system memory and including one or more TLB entries, each TLB entry including a mapping between a virtual memory page and a physical page address, wherein the particular use of a system memory is selected from the group consisting of frame buffering, texture mapping, color indexing, and linear addressing of memory;

receiving a virtual address from a processor; and locating a TLB entry within the selected TLB segment, the located TLB entry including a mapping between the virtual memory page of the virtual address and a corresponding page address.

15. A method as recited in claim 14 further comprising the step of generating a TLB miss in the event that the selected TLB segment does not include a TLB entry that maps the virtual memory page of the virtual address to a corresponding page address.

16. A method as recited in claim 14 further comprising the steps of:

extracting a page offset from the virtual address; and adding the page offset to the page address.

17. A method as recited in claim 14 wherein the TLB includes segments for tiled and linear memory.

18. A method as recited in claim 14 wherein the processor is a rendering engine.

19. A method as recited in claim 14 further comprising the step of initializing the descriptor table entries and TLB entries with data received from a processor.

* * * * *